(12) United States Patent
Wentink et al.

(10) Patent No.: US 9,781,235 B2
(45) Date of Patent: Oct. 3, 2017

(54) SUBFRAME FORMAT INDICATION FIELD

(71) Applicant: QUALCOMM Incorporated, San Diego, CA (US)

(72) Inventors: Maarten Menzo Wentink, Naarden (NL); Alfred Asterjadhi, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 179 days.

(21) Appl. No.: 14/208,808

(22) Filed: Mar. 13, 2014

(65) Prior Publication Data

US 2014/0269559 A1    Sep. 18, 2014

Related U.S. Application Data

(60) Provisional application No. 61/781,819, filed on Mar. 14, 2013.

(51) Int. Cl.
*H04L 29/08* (2006.01)
*H04W 28/06* (2009.01)

(52) U.S. Cl.
CPC .......... *H04L 69/324* (2013.01); *H04W 28/06* (2013.01)

(58) Field of Classification Search
CPC ......... H04L 1/10; H04L 12/40; H04L 69/321; H04L 69/322; H04L 69/324; H04W 28/06; H04W 28/32
USPC ........................................ 370/329
See application file for complete search history.

(56) References Cited

U.S. PATENT DOCUMENTS

| 1,589,704 | A | 6/1926 | Kenworthy | |
|---|---|---|---|---|
| 2003/0169769 | A1 | 9/2003 | Ho et al. | |
| 2005/0239456 | A1* | 10/2005 | Sung | E05B 65/0864 455/427 |
| 2006/0291461 | A1* | 12/2006 | Stephens | H04W 28/06 370/389 |
| 2008/0130538 | A1* | 6/2008 | Raissinia | H04W 28/06 370/310 |
| 2010/0315965 | A1* | 12/2010 | Nemeth | H04L 1/0083 370/252 |
| 2012/0099567 | A1* | 4/2012 | Hart | H04L 12/4633 370/338 |

(Continued)

FOREIGN PATENT DOCUMENTS

| EP | 1589704 A2 | 10/2005 | |
|---|---|---|---|
| JP | EP 1589704 A2 * | 10/2005 | H04L 1/1614 |

OTHER PUBLICATIONS

International Search Report and Written Opinion—PCT/US2014/028000—ISA/EPO—Aug. 6, 2014.

(Continued)

*Primary Examiner* — Sulaiman Nooristany
(74) *Attorney, Agent, or Firm* — Patterson & Sheridan, LLP

(57) ABSTRACT

Certain aspects of the present disclosure provide methods and apparatus for indicating a subframe format. For example, the apparatus may generally include a processing system configured to generate a subframe of a data unit, the subframe comprising a first field that indicates a presence or absence of at least one of a source address (SA) or destination address (DA) in the subframe. The apparatus may also include a transmitter configured to transmit the subframe to another apparatus using frame aggregation.

52 Claims, 10 Drawing Sheets

(56) References Cited

U.S. PATENT DOCUMENTS

2013/0195001 A1* 8/2013 Liu .................. H04L 69/04
370/312

OTHER PUBLICATIONS

Skordoulis D., et al., "IEEE 802.11n MAC frame aggregation mechanisms for next-generation high-throughput WLANs [medium access control protocols for wireless LANs]", IEEE Wireless Communications, IEEE Service Center, Piscataway, NJ, US, vol. 14, No. 1, Feb. 1, 2008 (Feb. 1, 2008), pp. 40-47, XP011204551, ISSN: 1536-1284 see section "MAC Enhancements" in pp. 43-44.

* cited by examiner

400

| AT | Meaning |
|---|---|
| 0 | No SA and DA present |
| 1 | Both SA and DA present |

| SA inferred source | DA inferred source |
|---|---|
| MPDU header | MPDU header |
| SA from prior MSDU in MPDU | DA from prior MSDU in MPDU |
| Stored SA at receiver | Stored DA at receiver |

FIG. 5

| SAP | Meaning |
|---|---|
| 0 | SA present |
| 1 | SA not present<br>- inferred from a stored SA, or<br>- inferred from the MPDU header when no SA is stored |
| 2 | SA not present<br>- inferred from the latest SA received in the A-MSDU |
| 3 | Reserved |

FIG. 6

| DAP | Meaning |
|---|---|
| 0 | DA present |
| 1 | DA not present<br>- inferred from a stored DA, or<br>- inferred from the MPDU header when no DA is stored |
| 2 | DA not present<br>- inferred from the latest DA received in the A-MSDU |
| 3 | Reserved |

| AT | SA and DA Specification |
|---|---|
| 0 | SA present<br>DA present |
| 1 | SA present<br>DA not present<br>- inferred from a stored DA, or<br>- inferred from the MPDU header when no DA is stored |
| 2 | SA present<br>DA not present<br>- inferred from the latest DA received in the A-MSDU |
| 3 | SA not present<br>- inferred from a stored SA, or<br>- inferred from the MPDU header when no SA is stored<br>DA present |
| 4 | SA not present<br>- inferred from a stored SA, or<br>- inferred from the MPDU header when no SA is stored<br>DA not present<br>- inferred from a stored DA, or<br>- inferred from the MPDU header when no DA is stored |
| 5 | SA not present<br>- inferred from a stored SA, or<br>- inferred from the MPDU header when no SA is stored<br>DA not present<br>- inferred from the latest DA received in the A-MSDU |
| 6 | SA not present<br>- inferred from the latest SA received in the A-MSDU<br>DA present |
| 7 | SA not present<br>- inferred from the latest SA received in the A-MSDU<br>DA not present<br>- inferred from a stored DA, or<br>- inferred from the MPDU header when no DA is stored |
| 8 | SA not present<br>- inferred from the latest SA received in the A-MSDU<br>DA not present<br>- inferred from the latest DA received in the A-MSDU |

| AT | SA | DA |
|---|---|---|
| 0 | SA present | DA present |
| 1 | SA present | DA stored or from MPDU header |
| 2 | SA present | latest DA in A-MSDU |
| 3 | SA stored or from MPDU header | DA present |
| 4 | SA stored or from MPDU header | DA stored or from MPDU header |
| 5 | SA stored or from MPDU header | latest DA in A-MSDU |
| 6 | latest SA in A-MSDU | DA present |
| 7 | latest SA in A-MSDU | DA stored or from MPDU header |
| 8 | latest SA in A-MSDU | latest DA in A-MSDU |

| AT | SA | DA |
|---|---|---|
| 0 | SA present | DA present |
| 1 | SA present | latest DA in A-MSDU |
| 2 | latest SA in A-MSDU | DA present |
| 3 | latest SA in A-MSDU | latest DA in A-MSDU |

| AT | SA | DA |
|---|---|---|
| 0 | SA present | DA present |
| 1 | latest SA in A-MSDU | latest DA in A-MSDU |

FIG. 11

SUBFRAME FORMAT INDICATION FIELD

CROSS-REFERENCE TO RELATED APPLICATIONS

The present Application for Patent claims priority to U.S. Provisional Application No. 61/781,819, filed Mar. 14, 2013, which is assigned to the assignee of the present application and hereby expressly incorporated by reference herein in its entirety.

FIELD OF THE INVENTION

Certain aspects of the present disclosure generally relate to wireless communications and, more particularly, to techniques for indicating a format of a subframe.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus typically includes a processing system configured to generate a subframe of a data unit, the subframe comprising a first field that indicates a presence or absence of at least one of a source address (SA) or destination address (DA) in the subframe and a transmitter configured to transmit the subframe to a receiver station in the data unit using frame aggregation.

Certain aspects of the present disclosure provide an apparatus for wireless communications. The apparatus typically includes a receiver configured to receive a subframe of a data unit sent using frame aggregation, the subframe comprising a first field that indicates a presence or absence of at least one of a source address (SA) or destination address (DA) in the subframe and a processing system configured to determine at least one of the SA and DA for the data unit based on one or more bits in the first field.

Certain aspects of the present disclosure provide an apparatus for wireless communications. The apparatus typically includes means for generating a subframe of a data unit, the subframe comprising a first field that indicates a presence or absence of at least one of a source address (SA) or destination address (DA) in the subframe and means for transmitting the subframe to a receiver station in the data unit using frame aggregation.

Certain aspects of the present disclosure provide an apparatus for wireless communications. The apparatus typically includes means for receiving a subframe of a data unit sent using frame aggregation, the subframe comprising a first field that indicates a presence or absence of at least one of a source address (SA) or destination address (DA) in the subframe and means for determining at least one of the SA and DA for the data unit based on one or more bits in the first field.

Certain aspects of the present disclosure provide a method for wireless communications by an apparatus. The method typically includes generating a subframe of a data unit, the subframe comprising a first field that indicates a presence or absence of at least one of a source address (SA) or destination address (DA) in the subframe and transmitting the subframe to a receiver station in the data unit using frame aggregation.

Certain aspects of the present disclosure provide a method for wireless communications by an apparatus. The method typically includes receiving a subframe of a data unit sent using frame aggregation, the subframe comprising a first field that indicates a presence or absence of at least one of a source address (SA) or destination address (DA) in the subframe and determining at least one of the SA and DA for the data unit based on one or more bits in the first field.

Certain aspects of the present disclosure provide a computer program product for wireless communications by an apparatus comprising a computer-readable medium having instructions stored thereon. The instructions are generally executable by one or more processors for generating a subframe of a data unit, the subframe comprising a first field that indicates a presence or absence of at least one of a source address (SA) or destination address (DA) in the subframe and transmitting the subframe to a receiver station in the data unit using frame aggregation.

Certain aspects of the present disclosure provide a computer program product for wireless communications by an apparatus comprising a computer-readable medium having instructions stored thereon. The instructions are generally executable by one or more processors for receiving a subframe of a data unit sent using frame aggregation, the subframe comprising a first field that indicates a presence or absence of at least one of a source address (SA) or destination address (DA) in the subframe and determining at least one of the SA and DA for the data unit based on one or more bits in the first field.

Certain aspects of the present disclosure provide a station. The station typically includes at least one antenna, a receiver configured to receive, via the at least one antenna, a subframe of a data unit sent using frame aggregation, the subframe comprising a first field that indicates a presence or absence of at least one of a source address (SA) or destination address (DA) in the subframe, and a processing system configured to determine at least one of the SA and DA for the data unit based on one or more bits in the first field.

Certain aspects of the present disclosure provide a station. The station typically includes at least one antenna, a processing system configured to generate a subframe of a data unit, the subframe comprising a first field that indicates a presence or absence of at least one of a source address (SA) or destination address (DA) in the subframe, and a transmitter configured to transmit, via the at least one antenna, the subframe to another station in the data unit using frame aggregation.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates an example address type field definition, in accordance with certain aspects of the present disclosure.

FIG. 5 illustrates example inferred source and destination address sources, in accordance with certain aspects of the present disclosure.

FIG. 6 illustrates an example source address present field definition, in accordance with certain aspects of the present disclosure.

FIG. 7 illustrates an example destination address present field definition, in accordance with certain aspects of the present disclosure.

FIGS. 8-11 illustrate example address type field value definitions, in accordance with certain aspects of the present disclosure.

DETAILED DESCRIPTION

Figure 1:
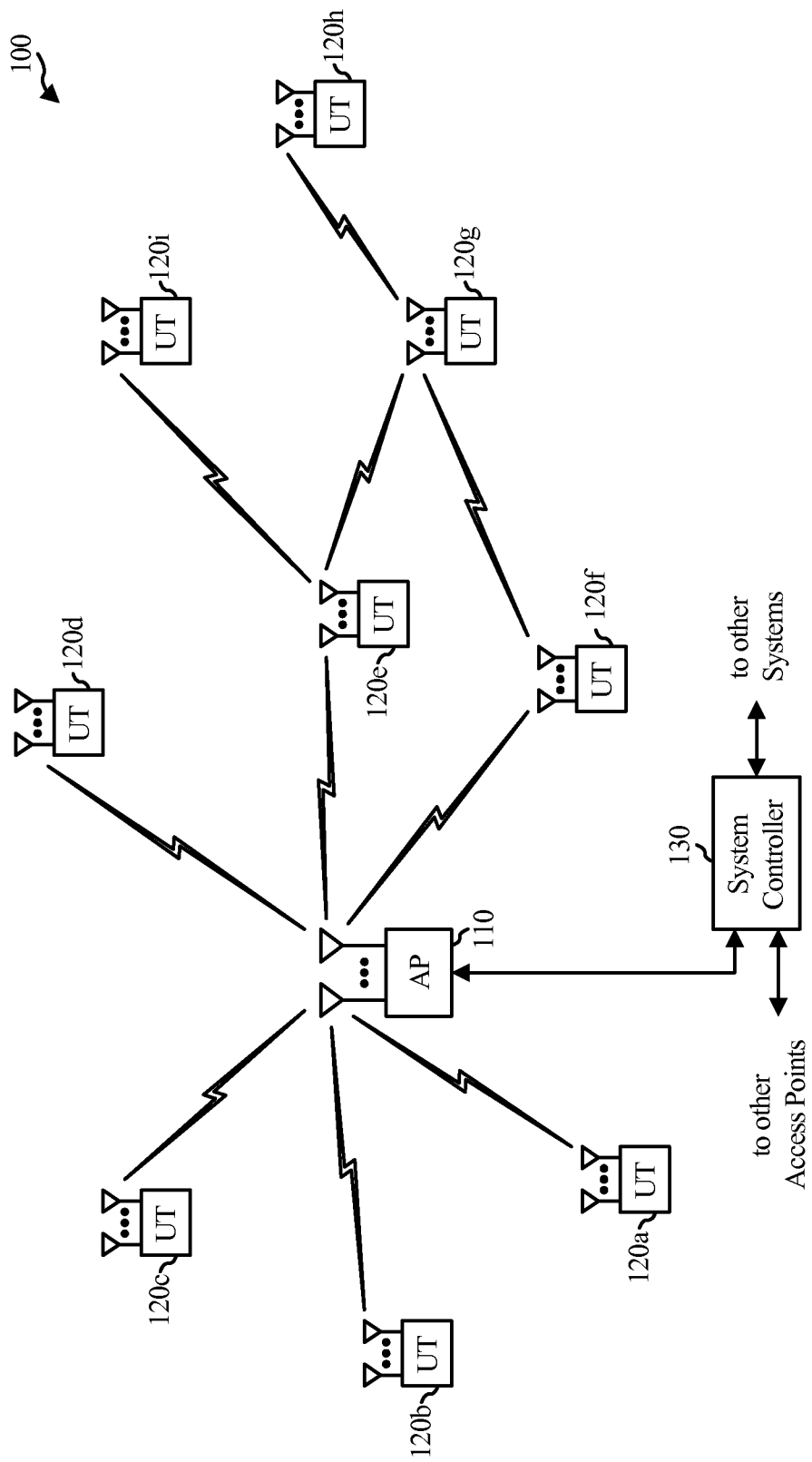
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
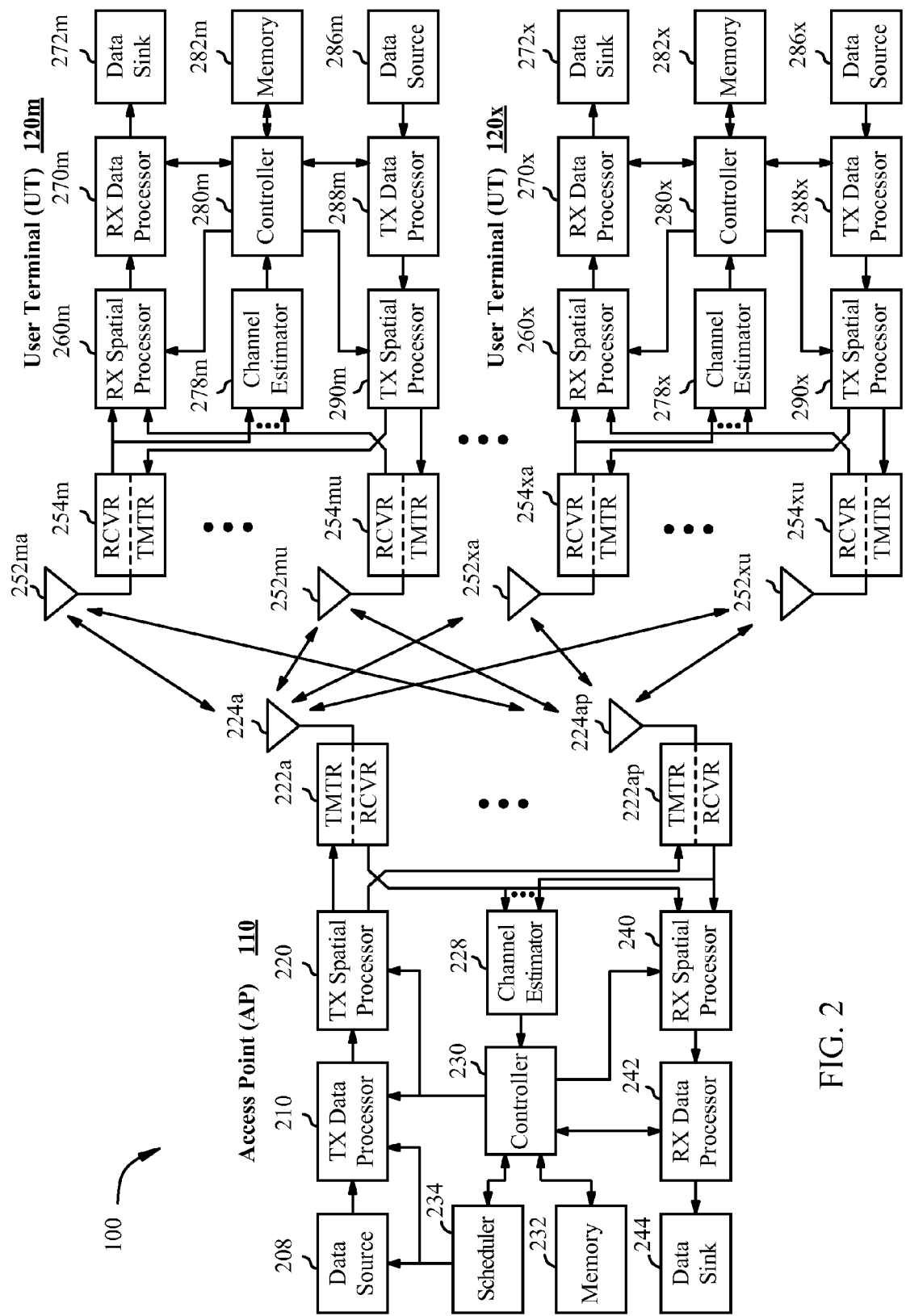
FIG. 2 illustrates a block diagram of an example access point and user terminals, in accordance with certain aspects of the present disclosure.

FIG. 2 illustrates a block diagram of access point 110 and two user terminals 120*m* and 120*x* in MIMO system 100. The access point 110 is equipped with $N_t$ antennas 224*a* through 224*t*. User terminal 120*m* is equipped with $N_{ut,m}$ antennas 252*ma* through 252*mu*, and user terminal 120*x* is equipped with $N_{ut,x}$ antennas 252*xa* through 252*xu*. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224*a* through 224*ap* receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
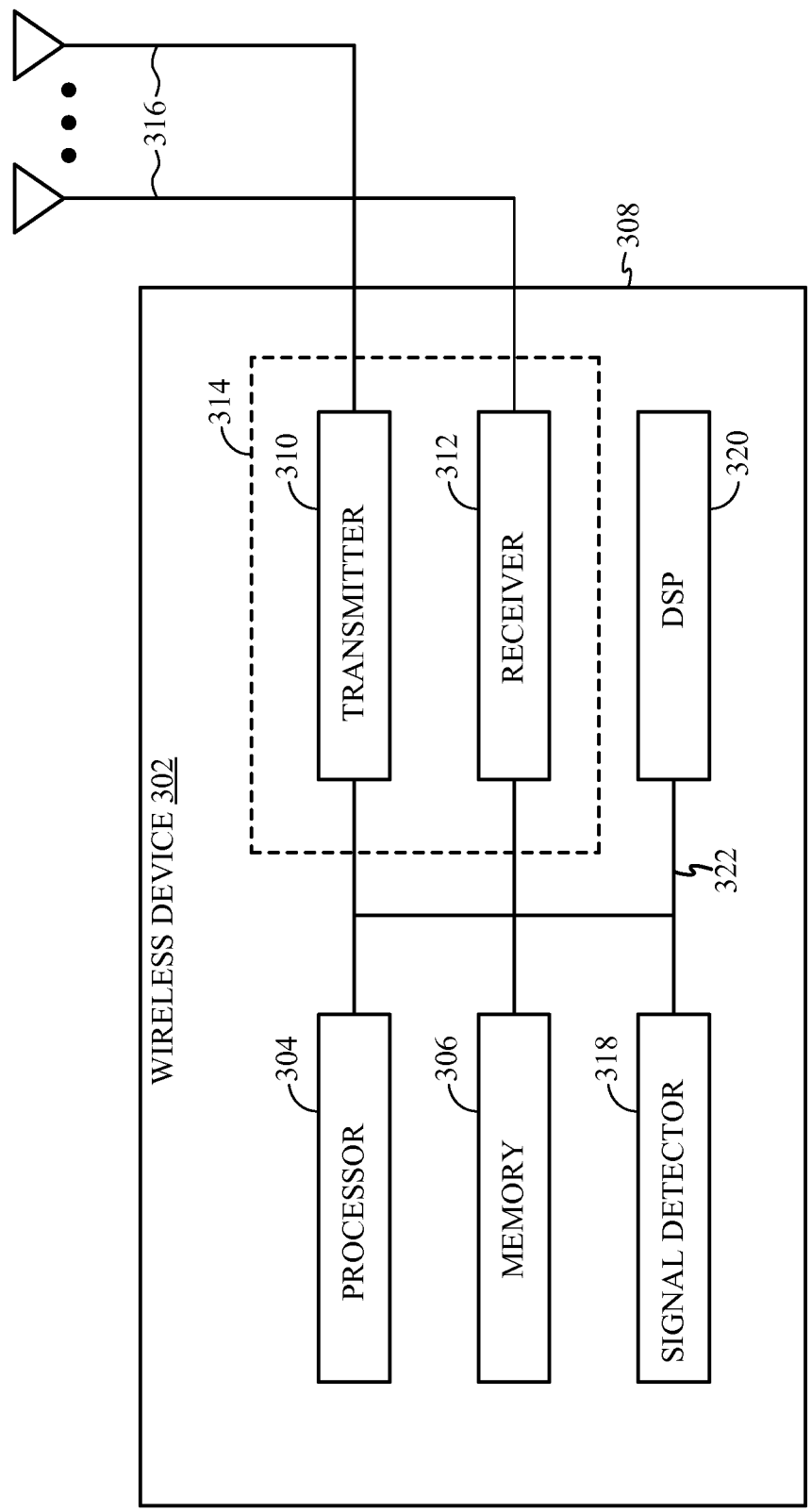
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example A-Msdu Subframe Format Indication Field

Aspects of the present disclosure provide techniques that may be employed to efficiently transmit data units using frame aggregation. The techniques presented herein may help reduce the amount of overhead used to convey source and destination addresses. As will be described in greater detail below, the source address and/or destination address may be inferred from other sources-rather than transmitted in a subframe of the data unit itself.

As a result, such aspects may help address a common problem in systems (such as 802.11), where a conventional aggregated MAC service data unit (A-MSDU) subframe format includes two full source and destination MAC addresses. Aspects of the present disclosure reduce overhead by omitting one or both of these addresses in cases where these addresses may be inferred (by a recipient) from other sources.

In some cases, aspects of the present disclosure may help reduce the size of the Length field in the A-MSDU subframe, and add a field (referred to herein as an Addressing Type field) that specifies which addresses are included in the A-MSDU subframe. In other words, the Addressing Type (AT) field may indicate the presence or absence of a source address (SA) and/or destination address (DA). In some cases, to facilitate early detection of the subframe format, the AT and Length (Len) fields are also moved to the beginning of the A-MSDU subframe.

A conventional structure of the A-MSDU subframe has field in the following order:

DA/SA/LEN/MSDU where DA is the destination address, SA is a source address, LEN is a length field indicating a length of the corresponding MAC service data unit (MSDU). Aspects of the present disclosure, however, propose a new structure, with the aforementioned AT field, as follows:

AT/Len/{DA}/{SA}/MSDU.

As noted above, in some cases, the AT field may come before the Len field, which may help a receiving device earlier detect the subframe configuration. The brackets around DA and SA indicate that these fields may or may not be present, depending on the value of the AT field.

As noted above, the AT field indicates the presence (or absence) of address fields SA and DA. The Len field specifies the length of the MSDU, possibly including the length of the address fields (in which case the Len field specifies the number of octets following the Len field), and allows a receiving device to determine the end of the MSDU.

Again, the SA and DA fields are optionally present in this A-MSDU subframe format, and indicate respectively the Source Address and the Destination Address of the MSDU. In some cases, the order of the AT and Len fields may be reversed relative to the order described above:

Len/AT/{DA}/{SA}/MSDU

The length of the AT field (number of bits) may vary, depending on a particular implementation or configuration. According to certain aspects, the AT field may be comprised of one bit, with an exemplary definition 400 illustrated in FIG. 4. In the illustrated example, a value of "0" for AT may indicate neither SA nor DA is present in the subframe. On the other hand, a value of "1" for AT may indicate both SA and DA are present in the subframe.

In some cases, an AT field may have more bits to provide greater flexibility. For example, more bits may allow for independent indication of the presence or absence of an SA or DA field. As will be described in greater detail below, in the absence of either SA or DA field, a value of the AT field may indicate a source for inferring such an address, albeit at the cost of additional overhead (in the form of the extra bit/bits needed to indicate such a source).

As illustrated in the example definition 500 shown in FIG. 5, when an SA or DA is not included in an A-MSDU subframe, the SA or DA can be inferred from various sources. For example, the sources may include an actual value in the MPDU header, an SA/DA from a previous MSDU (in the same MPDU), or an SA/DA stored at the receiver. The exact source or list of sources may depend on an actual implementation or agreement between operators and/or standards bodies.

In cases where the SA is inferred from the MPDU header, this may mean that the SA may be either explicitly present in the MPDU header or, if the SA is not explicitly present in the MPDU header, the SA may be equal to the transmitter address (TA) of the MPDU, commonly referred to as address 2 (A2). Similarly, in cases where DA is inferred from the MPDU, this may mean that the DA is either explicitly present in the MPDU header, or if the DA is not explicitly present in the MPDU header, the DA may be equal to the receiver address (RA) of the MPDU, commonly referred to as address 1 (A1).

According to certain aspects, an A-MSDU subframe format may include a multi-bit (e.g., 2-bit) SA Present (SAP) field and a multi-bit (e.g., 2-bit) DA present (DAP) field, as follows:

SAP/DAP/Len/{SA}/{DA}/MSDU

An exemplary definition of a 2-bit SAP field is shown in the definition 600 of FIG. 6. As An exemplary definition of a 2-bit DAP field is shown the definition 700 of FIG. 7. As illustrated, a value of 0 may indicate the presence of an SA/DA in the subframe, while different non-zero values may indicate different sources from which a SA/DA may be inferred.

In some cases, a 3-bit AT field may be defined, for example, by combining the SAP and DAP fields as illustrated the definition 800 shown in FIG. 8. As illustrated, a value of 0 may indicate the presence of both an SA and DA in the subframe, while different non-zero values may indicate different combinations of SA or DA, along with different sources from which the corresponding addresses may be inferred. FIG. 9 shows a definition 900 with a similar mapping as the definition 800 shown in FIG. 8, but with arranged to show the source of inference for each of the omitted address(es).

FIG. 10 shows an exemplary definition 1000 of an AT field with even fewer bits (2-bit) than the example shown in FIGS. 8 and 9. Again, a value of 0 may indicate the presence of both an SA and DA in the subframe but, in this example, the fewer bits allows fewer combinations of inferred sources for an omitted SA or DA. FIG. 11 shows another exemplary definition 1100 of an AT field with a single bit. Again, a value of 0 may indicate the presence of both an SA and DA in the subframe but, in this example, a value of 1 may indicate absence of both SA and DA, as well as an inferred source for each of the omitted addresses.

Figure 12:
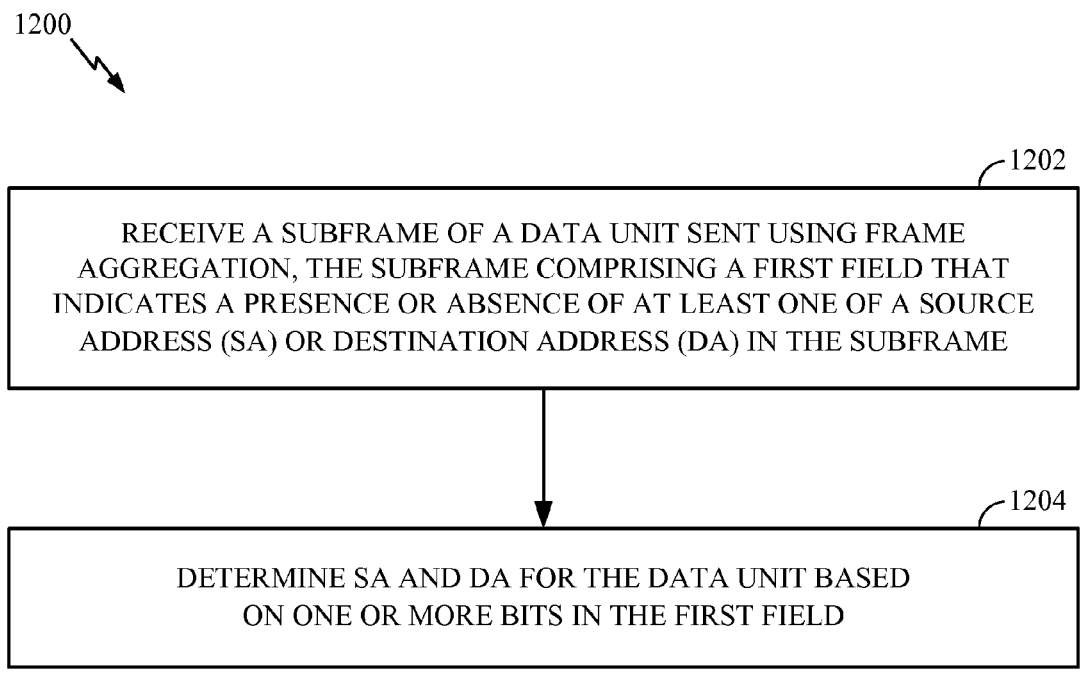
FIG. 12 illustrates example operations for wireless communications by a recipient, in accordance with certain aspects of the present disclosure.

FIG. 12 is a block diagram of example operations 1200 for wireless communications by a receiving apparatus, in accordance with aspects of the present disclosure. The operations 1200 may be performed by an apparatus, such as a receiving station (RX-STA).

At 1202, the apparatus receives a subframe of a data unit sent using frame aggregation, the subframe comprising a first field that indicates a presence or absence of at least one of a source address (SA) or destination address (DA) in the subframe. At 1204, the apparatus determines SA and DA for the data unit based on one or more bits in the first field.

Figure 13:
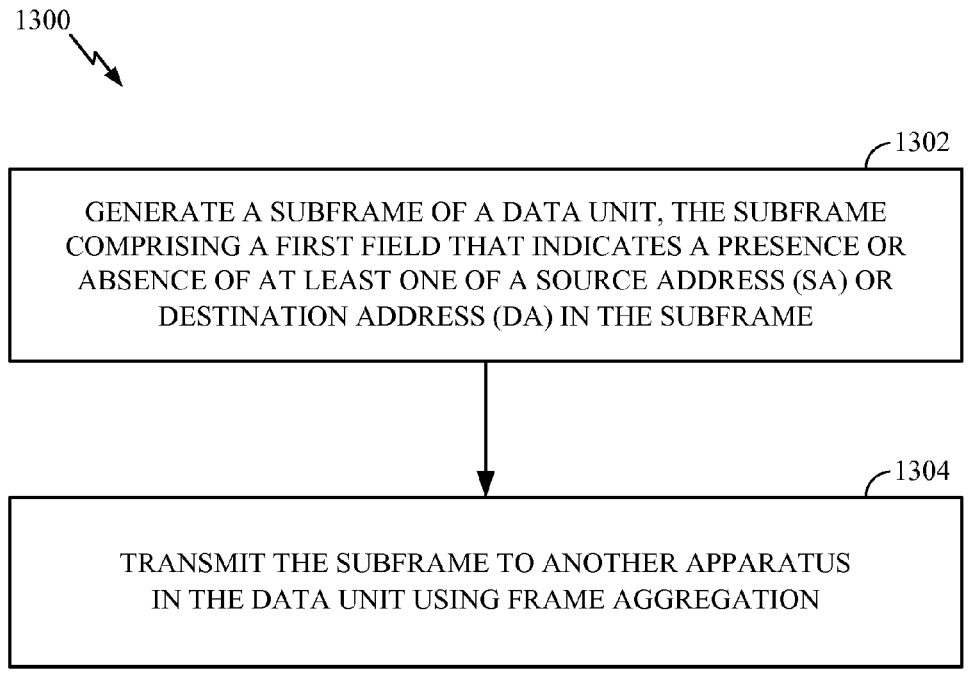
FIG. 13 illustrates a block diagram of example operations for wireless communications by a transmitter, in accordance with certain aspects of the present disclosure.

FIG. 13 is a block diagram of example operations 1300 for wireless communications by a transmitting apparatus, in accordance with aspects of the present disclosure. The operations 1300 may be performed by an apparatus, such as a TX-STA. Thus, the operations may be considered complementary to those shown in FIG. 12.

At 1302, the apparatus generates a subframe of a data unit, the subframe comprising a first field that indicates a presence or absence of at least one of a source address (SA) or destination address (DA) in the subframe. At 1304, the apparatus transmit the subframe to another apparatus in the data unit using frame aggregation.

As noted above, the AT field may be located in the subframe prior to a second field indicating a length of a Mac Service Data Unit (MSDU) in the subframe. In some cases, the AT field may be located in the subframe prior to a location of at least one of the SA or DA, if present in the subframe.

As noted above and in the figures, a single bit of the AT field may indicate either the presence of both the SA and DA in the subframe or the absence of both the SA and DA from the subframe.

The AT field may also indicate that a value of at least one of an SA or DA is to be determined by the other apparatus from a source other than the subframe if at least one of an SA or DA is absent from the subframe. The source may comprise at least one of: a MAC protocol data unit (MPDU) header, a prior MSDU received before the subframe, or a value stored at the apparatus. In some cases an SA may be determined from a transmitter address (TA) in the MPDU header or a DA may be determined from a receiver address (RA) in the MPDU header.

According to certain aspects, the AT field may have an SA present field with one or more bits indicating presence of the SA in the subframe or a source for inferring the SA if not present in the subframe and/or a DA present field having one or more bits indicating presence of the DA in the subframe or a source for inferring the DA if not present in the subframe. In such cases, the SA present field may indicate, if the SA is absent from the subframe, the SA is to be inferred from at least one of a MAC protocol data unit (MPDU) header transmitted to the receiver, a prior MSDU transmitted before the subframe, or a value stored at the receiver. Similarly, the DA present field may indicate, if the DA is absent from the subframe, the DA is to be inferred from at least one of MAC protocol data unit (MPDU) header transmitted to the receiver, a prior MSDU transmitted before the current subframe, or a value stored at the receiver.

Figure 12A:
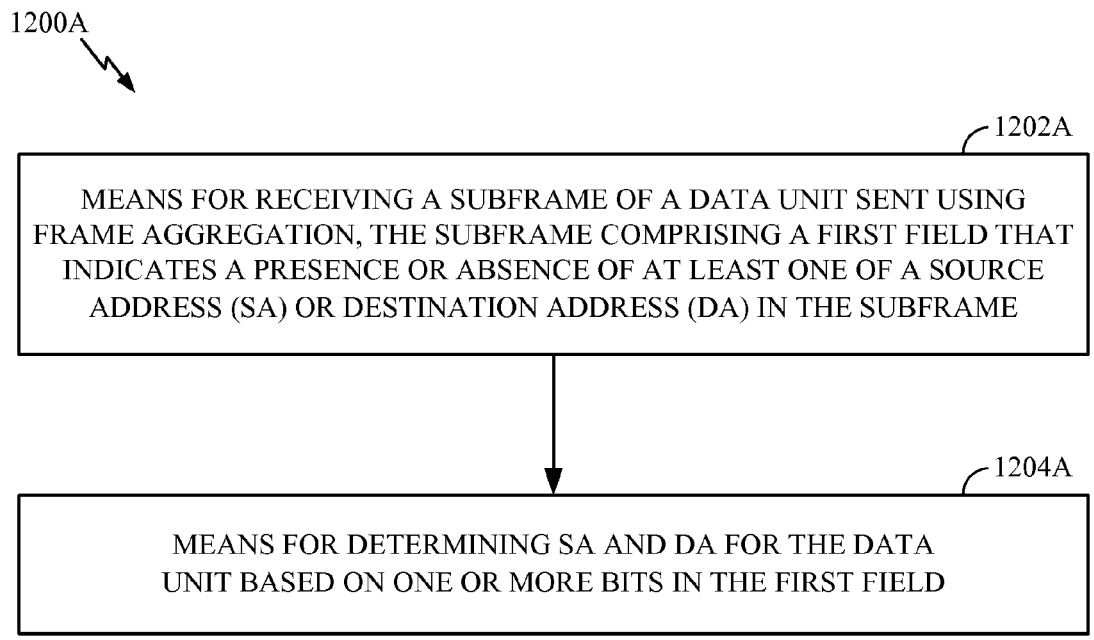
FIG. 12A illustrates example means capable of performing the operations shown in FIG. 12.
Figure 13A:
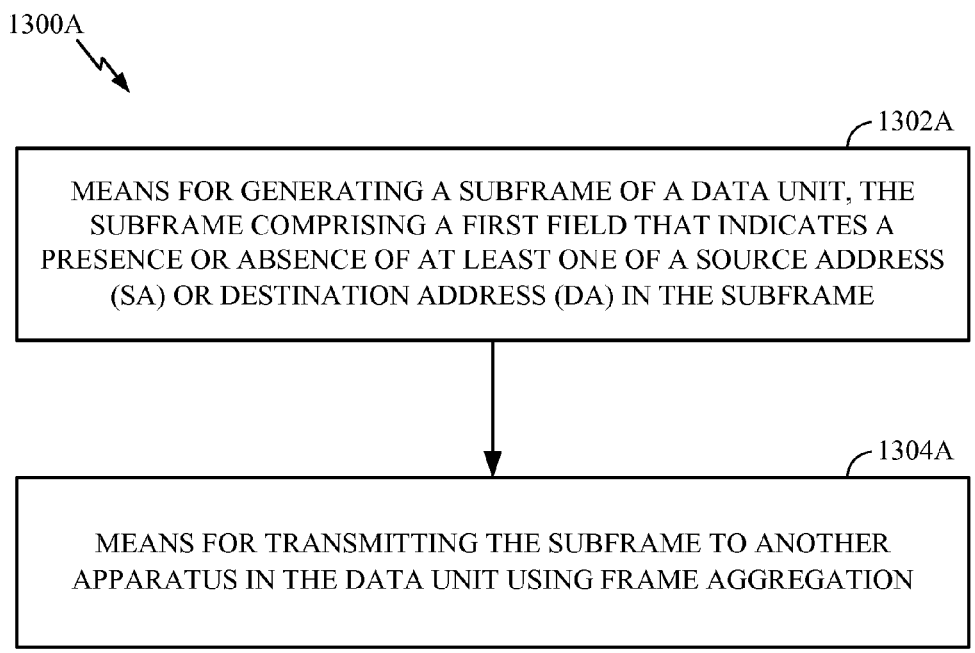
FIG. 13A illustrates example means capable of performing the operations shown in FIG. 13.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 1200 and 1300 illustrated in FIGS. 12 and 13 correspond to means 1200A and 1300A illustrated in FIGS. 12A and 13A, respectively.

For example, means for transmitting may comprise a transmitter (e.g., the transmitter unit 222) and/or an antenna (s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, means for detecting, means for scanning, means for selecting, or means for terminating operation may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

Further, in some cases, rather than actually transmit a subframe (or other structure), an entity (e.g., a processor) may output such a structure (e.g., via a bus) to another entity (e.g., an RF front end or modem) for transmission. Similarly, rather than actually receive a subframe (or other structure), an entity (e.g., a processor) may receive such a structure (e.g., via a bus) from another entity (e.g., from an RF front end or modem).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:
1. An apparatus for wireless communications, comprising:
    a processing system configured to generate a subframe of a data unit, the subframe comprising a first field that indicates a presence or absence of at least one of a source address (SA) or destination address (DA) in the subframe; and a transmitter configured to transmit the subframe to another apparatus using frame aggregation, wherein the processing system is configured to indicate, to the other apparatus, a source in a header of the data unit for inferring at least one of the SA or DA when the at least one of the SA or DA is absent from the subframe and when the at least one SA or DA is not stored at the other apparatus.

2. The apparatus of claim 1, wherein the first field is located in the subframe prior to a second field indicating a length of a Mac Service Data Unit (MSDU) in the subframe.

3. The apparatus of claim 1, wherein the first field is located in the subframe prior to a location of at least one of the SA or DA, if present in the subframe.

4. The apparatus of claim 1, wherein a single bit of the first field indicates either:
the presence of both the SA and DA in the subframe; or
the absence of both the SA and DA from the subframe.

5. The apparatus of claim 1, wherein the source comprises at least one of: a MAC protocol data unit (MPDU) header or a prior MSDU received before the subframe.

6. The apparatus of claim 5, wherein the processing system is configured to indicate, via the first field, at least one of:
a SA is to be determined from a transmitter address (TA) in the MPDU header; or
a DA is to be determined from a receiver address (RA) in the MPDU header.

7. The apparatus of claim 1, wherein the first field comprises at least one of:
a SA present field having one or more bits indicating presence of the SA in the subframe; or
a DA present field having one or more bits indicating presence of the DA in the subframe.

8. The apparatus of claim 7, wherein the SA present field indicates, if the SA is absent from the subframe, the SA is to be inferred from at least one of a MAC protocol data unit (MPDU) header transmitted to the other apparatus, a prior MSDU transmitted before the subframe, or a value stored at the other apparatus.

9. The apparatus of claim 7, wherein the DA present field indicates, if the DA is absent from the subframe, the DA is to be inferred from at least one of MAC protocol data unit (MPDU) header transmitted to the other apparatus, a prior MSDU transmitted before the subframe, or a value stored at the other apparatus.

10. An apparatus for wireless communications, comprising:
a receiver configured to receive, from another apparatus, a subframe of a data unit sent using frame aggregation, the subframe comprising a first field that indicates a presence or absence of at least one of a source address (SA) or destination address (DA) in the subframe; and
a processing system configured to:
determine the presence or absence of at least one of the SA or DA for the data unit based on one or more bits in the first field; and
infer the at least one SA or DA from a source in a header of the data unit when the at least one of the SA or DA is absent from the subframe and when the at least one of the SA or DA is not stored at the apparatus.

11. The apparatus of claim 10, wherein a single bit of the first field indicates either:
the presence of both the SA and DA in the subframe; or
the absence of both the SA and DA from the subframe.

12. The apparatus of claim 10, wherein the source comprises at least one of: a MAC protocol data unit (MPDU) header or a prior MSDU received before the subframe.

13. The apparatus of claim 12, wherein the processing system is configured to infer at least one of:
a SA from a transmitter address (TA) in the MPDU header; or
a DA from a receiver address (RA) in the MPDU header.

14. The apparatus of claim 10, wherein the processing system determines at least one of:
a SA based on a SA present field in the subframe having one or more bits indicating presence of the SA in the subframe; or
a DA based on a DA present field in the subframe having one or more bits indicating presence of the DA in the subframe.

15. The apparatus of claim 14, wherein the SA present field indicates, if the SA is absent from the subframe, the SA is to be inferred from at least one of a MAC protocol data unit (MPDU) header, a prior MSDU received before the subframe, or a value stored at the apparatus.

16. The apparatus of claim 14, wherein the DA present field indicates, if the DA is absent from the subframe, the DA is to be inferred from at least one of MAC protocol data unit (MPDU) header, a prior MSDU received before the subframe, or a value stored at the apparatus.

17. An apparatus for wireless communications, comprising:
means for generating a subframe of a data unit, the subframe comprising a first field that indicates a presence or absence of at least one of a source address (SA) or destination address (DA) in the subframe; and
means for transmitting the subframe to another apparatus using frame aggregation, wherein the means for generating is configured to indicate, to the other apparatus, a source in a header of the data unit for inferring at least one of the SA or DA if the at least one of the SA or DA is absent from the subframe and if the at least one SA or DA is not stored at the other apparatus.

18. The apparatus of claim 17, wherein the first field is located in the subframe prior to a second field indicating a length of a Mac Service Data Unit (MSDU) in the subframe.

19. The apparatus of claim 17, wherein the first field is located in the subframe prior to a location of at least one of the SA or DA, if present in the subframe.

20. The apparatus of claim 17, wherein a single bit of the first field indicates either:
the presence of both the SA and DA in the subframe; or
the absence of both the SA and DA from the subframe.

21. The apparatus of claim 17, wherein the source comprises at least one of: a MAC protocol data unit (MPDU) header or a prior MSDU received before the subframe.

22. The apparatus of claim 21, wherein the means for generating is configured to indicate, via the first field, at least one of:
an SA is to be determined from a transmitter address (TA) in the MPDU header; or
a DA is to be determined from a receiver address (RA) in the MPDU header.

23. The apparatus of claim 17, wherein the first field comprises at least one of:
an SA present field having one or more bits indicating presence of the SA in the subframe; or
a DA present field having one or more bits indicating presence of the DA in the subframe.

24. The apparatus of claim 23, wherein the SA present field indicates, if the SA is absent from the subframe, the SA is to be inferred from at least one of a MAC protocol data unit (MPDU) header transmitted to the other apparatus, a prior MSDU transmitted before the subframe, or a value stored at the other apparatus.

25. The apparatus of claim 23, wherein the DA present field indicates, if the DA is absent from the subframe, the DA is to be inferred from at least one of MAC protocol data unit (MPDU) header transmitted to the other apparatus, a prior MSDU transmitted before the subframe, or a value stored at the other apparatus.

26. An apparatus for wireless communications, comprising: means for receiving, from another apparatus, a subframe of a data unit sent using frame
   aggregation, the subframe comprising a first field that indicates a presence or absence of at least one of a source address (SA) or destination address (DA) in the subframe;
   means for determining the presence or absence of at least one of the SA or DA for the data unit based on one or more bits in the first field: and
   means for inferring the at least one SA or DA from a source in a header of the data unit when the at least one of the SA or DA is absent from the subframe and when the at least one of the SA or DA is not stored at the apparatus.

27. The apparatus of claim 26, wherein a single bit of the first field indicates either:
   the presence of both the SA and DA in the subframe; or
   the absence of both the SA and DA from the subframe.

28. The apparatus of claim 26, wherein the source comprises at least one of: a MAC protocol data unit (MPDU) header or a prior MSDU received before the subframe.

29. The apparatus of claim 28, wherein the means for inferring is configured to infer at least one of:
   an SA from a transmitter address (TA) in the MPDU header; or
   a DA from a receiver address (RA) in the MPDU header.

30. The apparatus of claim 26, wherein the means for inferring infers at least one of:
   an SA based on an SA present field in the subframe having one or more bits indicating presence of the SA in the subframe; or
   a DA based on a DA present field in the subframe having one or more bits indicating presence of the DA in the subframe.

31. The apparatus of claim 30, wherein the SA present field indicates, if the SA is absent from the subframe, the SA is to be inferred from at least one of a MAC protocol data unit (MPDU) header, a prior MSDU received before the subframe, or a value stored at the apparatus.

32. The apparatus of claim 30, wherein the DA present field indicates, if the DA is absent from the subframe, the DA is to be inferred from at least one of MAC protocol data unit (MPDU) header, a prior MSDU received before the subframe, or a value stored at the apparatus.

33. A method for wireless communications by an apparatus, comprising:
   generating a subframe of a data unit, the subframe comprising a first field that indicates a presence or absence of at least one of a source address (SA) or destination address (DA) in the subframe; and
   transmitting the subframe to another apparatus using frame aggregation; and
   indicating, to the other apparatus, a source in a header of the data unit for inferring at least one of the SA or DA when the at least one of the SA or DA is absent from the subframe and when the at least one SA or DA is not stored at the other apparatus.

34. The method of claim 33, wherein the first field is located in the subframe prior to a second field indicating a length of a Mac Service Data Unit (MSDU) in the subframe.

35. The method of claim 33, wherein the first field is located in the subframe prior to a location of at least one of the SA or DA, if present in the subframe.

36. The method of claim 33, wherein a single bit of the first field indicates either:
   the presence of both the SA and DA in the subframe; or
   the absence of both the SA and DA from the subframe.

37. The method of claim 33, wherein the source comprises at least one of: a MAC protocol data unit (MPDU) header or a prior MSDU received before the subframe.

38. The method of claim 37, wherein the generating comprises indicating, via the first field, at least one of:
   an SA is to be determined from a transmitter address (TA) in the MPDU header; or
   a DA is to be determined from a receiver address (RA) in the MPDU header.

39. The method of claim 33, wherein the first field comprises at least one of:
   an SA present field having one or more bits indicating presence of the SA in the subframe; or
   a DA present field having one or more bits indicating presence of the DA in the subframe.

40. The method of claim 39, wherein the SA present field indicates, if the SA is absent from the subframe, the SA is to be inferred from at least one of a MAC protocol data unit (MPDU) header transmitted to the other apparatus, a prior MSDU transmitted before the subframe, or a value stored at the other apparatus.

41. The method of claim 40, wherein the DA present field indicates, if the DA is absent from the subframe, the DA is to be inferred from at least one of MAC protocol data unit (MPDU) header transmitted to the other apparatus, a prior MSDU transmitted before the subframe, or a value stored at the other apparatus.

42. A method for wireless communications, comprising: receiving, from another apparatus, a subframe of a data unit sent using frame aggregation,
   the subframe comprising a first field that indicates a presence or absence of at least one of a source address (SA) or destination address (DA) in the subframe;
   determining the presence or absence of at least one of the SA or DA for the data unit based on one or more bits in the first field; and
   inferring the at least one SA or DA from a source in a header of the data unit when at least one of the SA or DA is absent from the subframe and when the at least one of the SA or DA is not stored at the apparatus.

43. The method of claim 42, wherein a single bit of the first field indicates either:
   the presence of both the SA and DA in the subframe; or
   the absence of both the SA and DA from the subframe.

44. The method of claim 42, wherein the source comprises at least one of: a MAC protocol data unit (MPDU) header or a prior MSDU received before the subframe.

45. The method of claim 44, wherein the inferring comprises inferring at least one of:
   an SA from a transmitter address (TA) in the MPDU header; or
   a DA from a receiver address (RA) in the MPDU header.

46. The method of claim 42, wherein the inferring comprises inferring at least one of:

an SA based on an SA present field in the subframe having one or more bits indicating presence of the SA in the subframe; or a DA based on a DA present field in the subframe having one or more bits indicating presence of the DA in the subframe.

47. The method of claim 46, wherein the SA present field indicates, if the SA is absent from the subframe, the SA is to be inferred from at least one of a MAC protocol data unit (MPDU) header, a prior MSDU received before the subframe, or a value stored at the apparatus.

48. The method of claim 46, wherein the DA present field indicates, if the DA is absent from the subframe, the DA is to be inferred from at least one of MAC protocol data unit (MPDU) header, a prior MSDU received before the subframe, or a value stored at the apparatus.

49. A station, comprising: at least one antenna;
a processing system configured to generate a subframe of a data unit, the subframe comprising a first field that indicates a presence or absence of at least one of a source address (SA) or destination address (DA) in the subframe; and
a transmitter configured to transmit, via the at least one antenna, the subframe to another station using frame aggregation, wherein the processing system is configured to indicate, to the other apparatus, a source in a header of the data unit for inferring at least one of the SA or DA when the at least one of the SA or DA is absent from the subframe and when the at least one SA or DA is not stored at the other apparatus.

50. A station, comprising: at least one antenna;
a receiver configured to receive, from another apparatus and via the at least one antenna, a subframe of a data unit sent using frame aggregation, the subframe comprising a first field that indicates a presence or absence of at least one of a source address (SA) or destination address (DA) in the subframe; and
a processing system configured to:
determine the presence or absence of at least one of the SA or DA for the data unit based on one or more bits in the first field; and infer the at least one SA or DA from a source in a header of the data unit when the at least one of the SA or DA is absent from the subframe and when the at least one of the SA or DA is not stored at the apparatus; and inferring the at least one of the SA or DA based on the determined source.

51. A non-transitory computer readable medium for wireless communications by an apparatus, the non-transitory computer readable medium having instructions stored thereon for:

generating a subframe of a data unit, the subframe comprising a first field that indicates a presence or absence of at least one of a source address (SA) or destination address (DA) in the subframe;

transmitting the subframe to another apparatus using frame aggregation; and indicating, to the other apparatus, a source in a header of the data unit for inferring at least one of the SA or DA when the at least one of the SA or DA is absent from the subframe and when the at least one SA or DA is not stored at the other apparatus.

52. A non-transitory computer readable medium for wireless communications by an apparatus, the non-transitory computer readable medium having instructions stored thereon for:

receiving, from another apparatus, a subframe of a data unit sent using frame aggregation, the subframe comprising a first field that indicates a presence or absence of at least one of a source address (SA) or destination address (DA) in the subframe; and determining the presence or absence of at least one of the SA or DA for the data unit based on one or more bits in the first field; and inferring the at least one SA or DA from a source in a header of the data unit when at least one of the SA or DA is absent from the subframe and when the at least one of the SA or DA is not stored at the apparatus.

* * * * *